United States Patent [19]
Ouden

[11] Patent Number: 5,195,675
[45] Date of Patent: Mar. 23, 1993

[54] METHOD FOR PRODUCING A COMPOSITE PIPE

[75] Inventor: Jacob D. Ouden, Noordeloos, Netherlands

[73] Assignee: Verolme Machinefabriek Ijsselmonde B.V., Al Rotterdam, Netherlands

[21] Appl. No.: 745,427

[22] Filed: Aug. 15, 1991

[51] Int. Cl.$^5$ .............................................. B21D 39/00
[52] U.S. Cl. .................................... 228/174; 228/122;
   228/173.5; 138/172; 138/173; 138/174;
   138/DIG. 6; 219/121.47; 219/121.46
[58] Field of Search ............... 228/119, 190, 174, 261,
   228/120, 122, 173.5, 169; 164/46; 242/68.5;
   138/172, 173, 174, DIG. 6; 219/121.47, 121.46,
   76.16; 427/286

[56] References Cited

U.S. PATENT DOCUMENTS

| | | | |
|---|---|---|---|
| 2,373,038 | 4/1945 | Lindsay | 228/184 |
| 2,375,068 | 5/1945 | Bennett | 228/174 |
| 3,377,757 | 4/1968 | Magers, Jr. | 138/172 |
| 4,066,201 | 1/1978 | Bleckmann | 228/183 |
| 4,113,132 | 9/1978 | Steiner | 138/172 |
| 4,251,907 | 2/1981 | Bleckmann et al. | 138/172 |
| 4,330,568 | 5/1982 | Boehm et al. | 219/76.16 |
| 4,474,233 | 10/1984 | Swozil | 138/172 |
| 4,590,116 | 5/1986 | Joly | 138/173 |
| 4,628,966 | 12/1986 | Kanao | 138/174 |
| 4,877,938 | 10/1989 | Rau et al. | 219/121.47 |

FOREIGN PATENT DOCUMENTS

| | | |
|---|---|---|
| 0031422 | 7/1981 | European Pat. Off. |
| 0258907 | 3/1988 | European Pat. Off. |
| 0271032 | 6/1988 | European Pat. Off. |
| 2024307 | 2/1971 | Fed. Rep. of Germany |
| 177623 | 9/1980 | Netherlands |
| 8403188 | 5/1986 | Netherlands |

Primary Examiner—Richard K. Seidel
Assistant Examiner—Chuck Y. Mah
Attorney, Agent, or Firm—Bachman & LaPointe

[57] ABSTRACT

Method for producing a composite pipe made of material which is resistant to an internal and/or external environment at a specific internal and/or external temperature and a specific internal and/or external pressure, the pipe being provided with a reinforcement made of material which at very high temperatures is resistant to compressive and tensile forces occurring during the use of the composite pipe, which reinforcement is provided with a diffusion barrier, wherein the reinforcement provided with a diffusion barrier is applied by welding or fusing to the outside of the pipe.

16 Claims, 2 Drawing Sheets

METHOD FOR PRODUCING A COMPOSITE PIPE

The invention relates to a method for producing a composite pipe made of material which is resistant to an internal and/or external environment at a specific internal and/or external temperature and a specific internal and/or external pressure, the pipe being provided with a reinforcement made of material which at very high temperatures is resistant to compressive and tensile forces occurring during the use of the composite pipe, which reinforcement is provided with a diffusion barrier.

A composite pipe is known from Dutch Patent Specification 177623. This composite pipe comprises an inner pipe, an outer pipe lying coaxially around it, and a reinforcement lying in between, made of, for example, spirally wound wires of molybdenum, tungsten, tantalum and the like. The inner pipe and the outer pipe are fused together, in the course of which the reinforcement between them is fused in between. The production of this known pipe is relatively complex, in particular because the whole unit has to be placed in an oven in which very high temperatures and pressures have to be generated for fusing together the two coaxial pipes and accommodating therein the reinforcement without cavities remaining. The use of two coaxial pipes also leads to a relatively great wall thickness, as a result of which, inter alia, the heat flow through this composite pipe is reduced, unless the temperature difference is increased, but this is not always possible in view of the maximum temperature.

A reinforcing wire with a diffusion barrier is disclosed in Dutch Patent Application 8,403,188, which has been laid open for inspection. This diffusion barrier prevents material of the reinforcement from diffusing outwards, but also prevents material of the pipe and other materials from diffusing into the material of the reinforcement. Because of this diffusion barrier, the features of the reinforcement and of the material of the pipe are retained, and the service life of the composite pipe and the maximum permissible wall temperature are considerably improved. The diffusion barrier is preferably made of ceramic material.

Assuming two coaxial pipes, the disadvantages mentioned earlier are now avoided in the method according to the present invention, which is characterised in that the reinforcement provided with a diffusion barrier is applied by welding or fusing to the outside of the pipe. The reinforcement can in this case lie on the outer surface, but it can also be partially or entirely underneath the outer surface.

The reinforcement provided with a diffusion barrier is preferably fixed on or in the outer wall of the pipe by means of welding or fusing. This can also be carried out using a plasma jet spraying method.

If the reinforcement is partially or fully welded or fused underneath the outer surface of the pipe, it is situated in a channel in the outer surface. Said channel can be covered with material of the pipe or with other suitable material after the reinforcement is applied. The method according to the invention produces a composite pipe with which much higher pipe wall temperatures are possible, in connection with the pipe wall loads occurring. The wall thickness of the pipe can also be reduced to the technically acceptable, also as regards corrosion.

Reinforcement which is used in the case of the production according to the invention is resistant to contact with liquid metals, as in the case of the fusion of materials in an electric arc.

The reinforcement can consist of wire with a round or rectangular cross-section which is placed, for example, in a spiral form around the pipe. A network of wires can also be used, or it is possible to use a pipe with regular, for example punched, holes which is pushed over the pipe and connected to the outer surface of the pipe by welding or fusing.

The invention will now be explained in greater detail with reference to the drawings, which show partial cross-sections of composite pipes during the manufacturing method.

Figure 1:
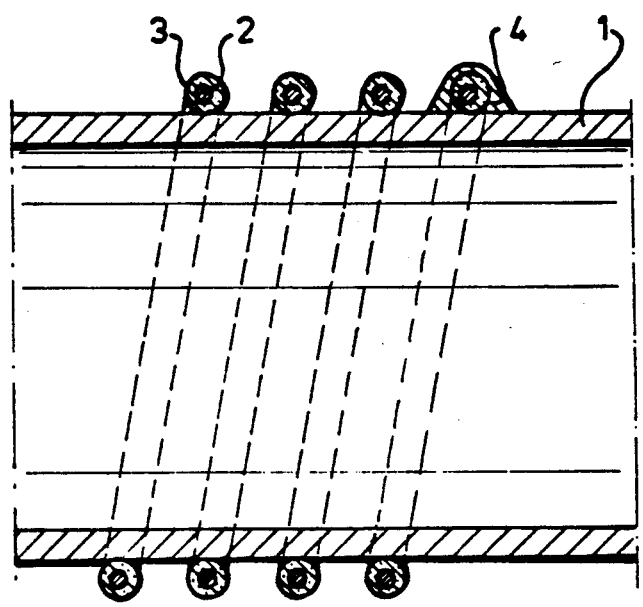
FIG. 1 shows a cross-section of a composite pipe in which the reinforcement is placed on the outer wall.

In FIG. 1 the pipe itself is indicated by 1, said pipe being itself resistant to a certain environment and certain temperatures, both inside and outside the pipe. These temperatures can, for example for a cracking method, lie in the range 1200°–1400° C. The pipe can be made of, for example, nickel and its alloys or stainless steel. In the use of the material of the pipe the melting point and the resistance to the above-mentioned environments are determining factors.

According to the invention, a reinforcement wire is placed around said pipe, comprising a core 2 of, for example, molybdenum, tungsten or tantalum or corresponding material, and a ceramic layer 3. This reinforcement is fixed to the outer surface of pipe 1 by means of a fusion layer or fusion weld, or using a plasma jet spraying method. This weld 4 can extend over the entire length of the reinforcement, but can also be applied locally and regularly distributed. It will be clear that the reinforcement does have to rest everywhere on the material of the pipe 1. This reinforcement means that the pipe 1 can tolerate much higher internal pressures than would be possible without reinforcement.

Figure 2:
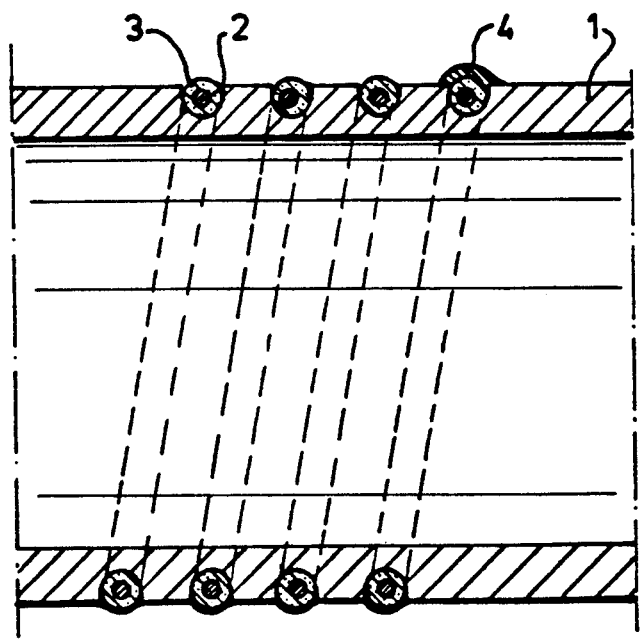
FIG. 2 shows a composite pipe in which the reinforcement is placed in the outer wall of the pipe.

FIG. 2 shows a composite pipe obtained according to the invention, in which the reinforcement is placed at least partially underneath the outer surface of the pipe 1. For this, channels can be provided in advance in the pipe 1, but the reinforcement can also be fused into the pipe 1, for example when applying the reinforcement by having it preceded by an arc through which the outer wall 1 melts locally and the reinforcement is drawn into this melt. After the application of the reinforcement a "weld" 4 can be applied again, which weld can extend over the entire length of the reinforcement, or which is applied locally. A plasma jet spraying method which is known per se can advantageously be used here. The weld 4, or fixing material, is preferably applied so as to at least partially encase the reinforcement.

Figure 3:
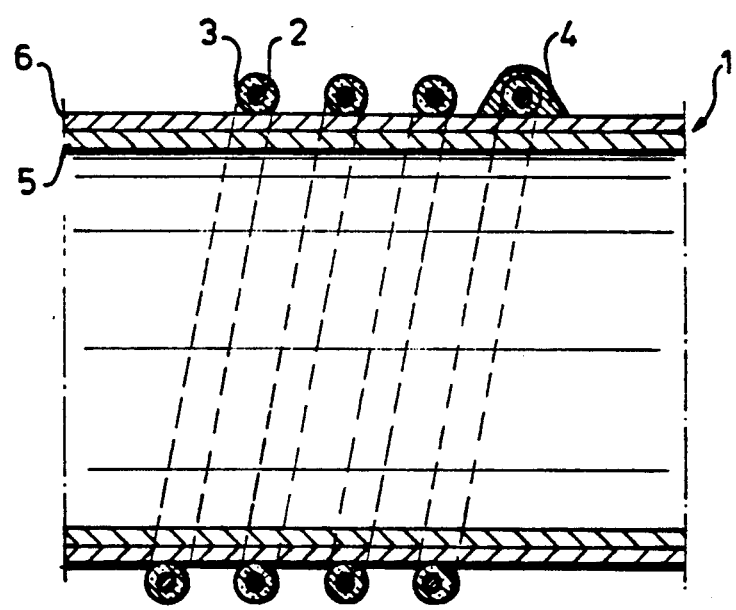
FIG. 3 shows a composite pipe where the pipe itself is made of two separate materials.

FIG. 3 shows an embodiment in which the pipe itself consists of two separate materials connected to each other, in which, for example, the inner layer 5 is resistant to environments and temperatures in the interior of the pipe and the outer layer 6 to environments and temperatures outside the pipe. It is true that the pipe in this case is also made of two separate coaxial parts as in the preamble, but through the application of the external reinforcement in the case of the present invention these can be much thinner than the individual pipes in the state of the art. The reinforcement is again made of a core 2 of molybdenum, tungsten or tantalum and the like and a ceramic casing 3.

It goes without saying that the invention is not restricted to the embodiments of the composite pipe shown, but that modifications and additions are possible when applying the reinforcement, without going beyond the scope of the invention.

I claim:

1. Method for producing a composite pipe suitable for use at high temperatures, comprising the steps of:
   (1) providing a metal pipe;
   (2) providing a reinforcement member comprising a reinforcing material encased in a molecular diffusion barrier material; and
   (3) fixing said reinforcement member to an outside surface of said pipe at least locally along a length of said reinforcement member.

2. Method according to claim 1, wherein the step of providing a reinforcement member comprises providing a reinforcing material encased in a ceramic diffusion barrier material.

3. Method according to claim 2, wherein the step of providing a reinforcement member further includes providing a reinforcement member comprising a reinforcing material selected from a group consisting of molybdenum, tungsten and tantalum.

4. Method according to claim 1, wherein the step of fixing said reinforcement member comprises applying a fusion weld at least locally along a length of said reinforcement member.

5. Method according to claim 1, wherein the step of fixing said reinforcement member comprises plasma spraying at least locally along a length of said reinforcement member.

6. Method for producing a composite pipe suitable for use at high temperatures, comprising the steps of:
   (1) providing a pipe;
   (2) providing a reinforcement member comprising a reinforcing material encased in a molecular diffusion barrier material; and
   (3) fixing said reinforcement member to an outside surface of said pipe by applying a fixing material at least locally along a length of said reinforcement member so as to at least partially encase said reinforcement member.

7. Method according to claim 6, wherein the step of providing a reinforcement member comprises providing a reinforcing material encased in a ceramic diffusion barrier material.

8. Method according to claim 7, wherein the step of providing a reinforcement member further includes providing a reinforcement member comprising a reinforcing material selected from a group consisting of molybdenum, tungsten and tantalum.

9. Method according to claim 6, wherein the step of fixing said reinforcement member comprises applying a fusion weld at least locally along a length of said reinforcement member.

10. Method according to claim 6, wherein the step of fixing said reinforcement member comprises plasma spraying at least locally along a length of said reinforcement member.

11. A method for producing a composite pipe suitable for use at high temperatures, comprising the steps of:
    (1) providing a pipe;
    (2) providing a reinforcement member comprising a reinforcing material encased in a molecular diffusion barrier material;
    (3) forming a channel in an outer surface of said pipe to accommodate said reinforcement member; and
    (4) fixing said reinforcement member in said channel at least locally along a length of said reinforcement member so as to at least partially encase said reinforcement member.

12. Method according to claim 11, wherein the step of providing a reinforcement member comprises providing a reinforcing material encased in a ceramic diffusion barrier material.

13. Method according to claim 12, wherein the step of providing a reinforcement member further includes providing a reinforcement member comprising a reinforcing material selected from a group consisting of molybdenum, tungsten and tantalum.

14. Method according to claim 11, wherein the step of fixing said reinforcement member comprises applying a fusion weld at least locally along a length of said reinforcement member.

15. Method according to claim 11, wherein the step of fixing said reinforcement member comprises plasma spraying at least locally along a length of said reinforcement member.

16. Method according to claim 11, wherein the step of forming a channel comprises applying an arc weld to an outer surface of said pipe so as to form a melted portion of said pipe, and disposing said reinforcement member in said melted portion of said pipe.

* * * * *